3,151,116
CERTAIN 2-AZA-INDOLO[2,3-a]QUINOLIZINE COMPOUNDS

George de Stevens, Willow Knoll, New Providence, and Herbert Morton Blatter, Millburn, N.J., assignors to Ciba Corporation, a corporation of Delaware
No Drawing. Filed Nov. 3, 1961, Ser. No. 149,867
4 Claims. (Cl. 260—268)

The present invention concerns compounds having the 1,2,3,4,6,7,12,12b - octahydro - 2 - aza - indolo[2,3-a]quinolizine ring system of the formula:

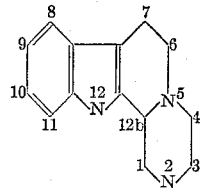

More particularly, it relates to compounds of the formula:

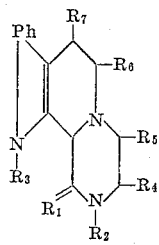

in which Ph stands for a 1,2-phenylene radical, $R_1$ represents two hydrogen atoms H(H) or an oxo group =O, $R_2$ stands for hydrogen or an organic radical, and each of the groups $R_3$, $R_4$, $R_5$, $R_6$ and $R_7$ stands for hydrogen or an aliphatic radical, salts, quaternary ammonium derivatives, N-oxides or salts of N-oxides thereof, as well as process for the preparation of such compounds.

The 1,2-phenylene (o-phenylene) radical may be unsubstituted or may have one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, such as lower alkoxy, e.g. methoxy, ethoxy, n-propyloxy, isopropyloxy and the like, esterified hydroxyl, such as halogeno (representing hydroxyl esterified by a hydrohalic acid), e.g. fluoro, chloro, bromo and the like, nitro, amino, such as N,N-di-lower alkyl-amino, e.g. N,N-dimethylamino, N,N-diethylamino and the like, trifluoromethyl, or any other suitable substituent. The 1,2-phenylene group Ph in the above formula stands, therefore, for 1,2-phenylene, lower alkyl-1,2-phenylene, hydroxy-1,2-phenylene, etherified hydroxy-1,2-phenylene, such as lower alkoxy-1,2-phenylene and the like, esterified hydroxy-1,2-phenylene, such as halogeno-1,2-phenylene and the like, nitro-1,2-phenylene, amino-1,2-phenylene, such as N,N-di-lower alkyl-amino-1,2-phenylene and the like, trifluoromethyl-1,2-phenylene or any other, suitably substituted 1,2-phenylene group.

As mentioned hereinbefore, the group $R_1$ stands for two hydrogen atoms represented by H(H) or for an oxo group of the formula =O.

An organic radical representing the group $R_2$, which also stands for hydrogen, is an aliphatic, a cycloaliphatic, a cycloaliphatic-aliphatic, a carbocyclic aryl, a carbocyclic arylaliphatic, a heterocyclic aryl, a heterocyclic arylaliphatic or an acyl radical.

An aliphatic radical representing $R_2$ is more particularly lower alkyl, having from one to ten, preferably from one to four carbon atoms, e.g. methyl, ethyl, n-propyl, isopropyl, n-butyl, secondary butyl, as well as n-pentyl, isopentyl, neopentyl, n-hexyl, isohexyl, n-heptyl, n-octyl, 2,2,3,3-tetramethylbutyl, n-nonyl, n-decyl and the like. Other aliphatic radicals are lower alkenyl having from two to ten, preferably from three to five, carbon atoms, e.g. allyl, 2-methyl-allyl, 2-butenyl, as well as vinyl, 2-hexenyl and the like, lower alkynyl, having from two to four, carbon atoms, e.g. ethynyl, 1-propynyl, propargyl and the like.

An aliphatic radical $R_2$, particularly lower alkyl, may also have functional groups as substituents; these substituents are preferably separated from the nitrogen atom to which the aliphatic radical is attached, by at least two carbon atoms. Suitable functional groups are, for example, hydroxyl, etherified hydroxyl, particularly lower alkoxy having from one to four carbon atoms, e.g. methoxy, ethoxy, n-propyloxy, isopropyloxy and the like, or phenyloxy, phenyl-lower alkoxy, e.g. benzyloxy, 2-phenylethyloxy and the like, mercapto, etherified mercapto, such as lower alkyl-mercapto having from one to four carbon atoms, e.g. methylmercapto, ethylmercapto, isopropylmercapto and the like, or phenyl-mercapto, phenyl-lower alkyl-mercapto, e.g. benzylmercapto, 2-phenylethylmercapto and the like, halogeno, e.g. fluoro, chloro, bromo and the like, or any other suitable substituent.

An aliphatic radical, such as lower alkyl, is primarily substituted by amino; an amino group substituting an aliphatic, particularly a lower alkyl, radical is preferably separated from the ring nitrogen atom by at least two carbon atoms. An amino group is primary amino or secondary amino, for example, N-lower alkyl-amino, in which lower alkyl has from one to seven, preferably from one to four, carbon atoms, e.g. N-methylamino, N-ethylamino, N-n-propylamino, N-isopropylamino, N-n-butylamino and the like, N-cycloalkyl-amino, in which cycloalkyl has from three to eight, preferably from five to seven, ring carbon atoms, e.g. N-cyclopentylamino, N-cyclohexylamino, N-cycloheptylamino and the like, N-carbocyclic aryl-amino, such as N-monocyclic carbocyclic arylamino, e.g. N-phenylamino and the like, or N-carbocyclic arylaliphatic-amino, such as N-monocyclic carbocyclic aryl-lower alkylamino, for example, N-phenyl-lower alkylamino, e.g. N-benzylamino, N-(2-phenylethyl)-amino and the like.

More especially, an aliphatic radical $R_2$, particularly lower alkyl, is substituted by tertiary amino, which is separated from the ring-nitrogen atom by at least two carbon atoms. A tertiary amino goup is, for example, an N,N-di-substituted amino group, such as N,N-di-lower alkylamino, in which lower alkyl has from one to four carbon atoms, e.g. N,N-dimethylamino, N-ethyl-N-methylamino, N,N-diethylamino, N,N-di-n-propylamino and the like, N-cycloalkyl-N-lower alkylamino, in which cycloalkyl has from three to eight, preferably from five to seven, ring carbon atoms, e.g. N-cyclopentyl-N-methylamino, N-cyclohexyl-N-methylamino, N-cycloheptyl-N-ethyl-amino and the like, or N-lower alkyl-N-phenyl-lower alkylamino, e.g. N-benzyl-N-methyl-amino, N-ethyl-N-(1-phenylethyl)-amino, N - methyl-N-(2-phenylethyl)-amino and the like. The substituents of the amino nitrogen in the above N,N-di-substituted amino groups, particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable group; N,N-di-substituted amino groups of this type are, for example, N-hydroxy-lower alkyl-N-lower alkyl-amino, e.g. N-(2-hydroxyethyl)-N-methyl-amino and the like, N,N-di-hydroxy-lower alkyl-amino, e.g. N,N-di-(2-hydroxyethyl)-amino and the like. A tertiary amino group attached to an aliphatic, particularly a lower alkyl, group $R_2$ may also be 1-N,N-alkylene-imino or 1-N,N-aza-alkylene-imino, in which alkylene has from four to six carbon atoms, as well as 1-N,N-oxa-alkylene-imino or 1-N,N-thia-alkylene-imino, in which alkylene has preferably four carbon atoms. Together with the nitrogen atom such alkylene, aza-alkylene, oxa-alkylene or thia-alkylene radicals represent, for example, 1-N,N-alkylene-imino, in which alkylene has from four to six carbon atoms, such as 1-pyrrolidino, e.g. 1-pyrrolidino, 2-methyl-1-pyrrolidino and the like, 1-piperidino, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-(aza-alkylene)-imino, particularly 1-N,N-(N-lower alkyl-aza-alkylene)-imino, in which alkylene has from four to six carbon atoms, such as 1-N,N-(3-aza-1,5-pentylene)-imino, particularly 3-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 4-morpholino, e.g. 4-morpholino, 3-methyl-4-morpholino and the like, 4-thiamorpholino, e.g. 4-thiamorpholino and the like, or any other equivalent tertiary amino group. An aliphatic, particularly a lower alkyl, radical with a tertiary amino group, is also a heterocyclic or a heterocyclic-lower alkyl radical in which the tertiary amino group is part of a heterocyclic nucleus. Such heterocyclic nucleus may be connected through one of its ring carbon atoms or through a lower alkylene radical, e.g. methylene, 1,2-ethylene and the like, with the ring nitrogen atom; such groups are represented, for example, by 1-methyl-3-pyrrolidylmethyl, 1-methyl-3-piperidylmethyl, 1-methyl-4-piperidyl and the like.

An organic radical $R_2$ attached to the ring nitrogen atom representing the 2-position, may also be a cycloaliphatic radical having from three to eight ring carbon atoms, and is more especially cycloalkyl having from three to eight, preferably from five to seven, ring carbon atoms, e.g. cyclopentyl, cyclohexyl or cycloheptyl, as well as cyclopropyl, cyclobutyl, cyclo-octyl and the like. It may also represent cycloalkenyl having from five to eight, preferably from five to seven, ring carbon atoms, e.g. 2-cyclopentenyl, 3-cyclopentenyl, 2-cyclohexenyl, 3-cyclohexenyl, 2-cycloheptenyl and the like, as well as 2-octenyl, 3-cyclooctenyl and the like, or any other suitable cycloaliphatic radical. These cycloaliphatic groups are unsubstituted, but may contain one or more than one of the same or different, particularly aliphatic, substituents, such as lower alkyl, e.g. methyl, ethyl, n-propyl, isopropyl and the like, or any other suitable substituent.

The organic group $R_2$ may also represent a cycloaliphatic-aliphatic radical, in which the cycloaliphatic portion has the meaning given above and stands particularly for cycloalkyl having from three to eight, preferably from five to seven, ring carbon atoms, e.g. cyclopentyl, cyclohexyl, cycloheptyl and the like, as well as cycloalkenyl having from five to eight, preferably from five to seven, ring carbon atoms, e.g. 1-cyclopentenyl, 2-cyclopentenyl, 3-cyclopentenyl, 1-cyclohexenyl, 2-cyclohexenyl, 3-cyclohexenyl, 1-cycloheptenyl and the like. The aliphatic portion connecting the cycloaliphatic group with the nitrogen atom, has from one to seven, preferably from one to four, carbon atoms, and stands primarily for lower alkylene having from one to four carbon atoms, which may be arranged in a straight or in a branched carbon chain, e.g. methylene, 1,1-ethylene, 1,2-ethylene, 1-methyl-1,2-ethylene, 2-methyl-1,2-ethylene, 1,3-propylene, 1,4-butylene, 2,3-butylene and the like. A cycloaliphatic-aliphatic radical may, therefore, be represented by cycloalkyl-lower alkyl, in which cycloalkyl has from three to eight, preferably from five to seven, carbon atoms, e.g. cyclopropylmethyl, cyclobutylmethyl, cyclopentylmethyl, cyclohexylmethyl, cycloheptylmethyl, cyclo-octylmethyl, 1-cyclopentylethyl, 1-cyclohexylethyl, 1-cycloheptylethyl, 2-cyclopropylethyl, 2-cyclobutylethyl, 2-cyclopentylethyl, 2-cyclohexylethyl, 2-cycloheptylethyl, 1-cyclopentylpropyl, 2-cyclopentylpropyl, 3-cyclopentylpropyl, 4-cyclopentylbutyl, 1-cyclohexylpropyl, 2-cyclohexylpropyl, 3-cyclohexylpropyl, 4-cyclohexylbutyl and the like, cycloalkenyl-lower alkyl, in which cycloalkenyl has from five to eight, preferably from five to seven, ring carbon atoms, e.g. 1-cyclopentenylmethyl, 2-cyclopentenylmethyl, 3-cyclopentenylmethyl, 1-cyclohexenylmethyl, 2-cyclohexenylmethyl, 3-cyclohexenylmethyl, 1-cycloheptenylmethyl, 1-(2-cyclopentenyl)-ethyl, 1-(3-cyclopentenyl)-ethyl, 1-(1-cyclohexenyl)-ethyl, 1-(2-cyclohexenyl)-ethyl, 1-(3-cyclohexenyl)-ethyl, 2-(1-cyclopentenyl)-ethyl, 2-(2-cyclopentenyl)-ethyl, 2-(3-cyclopentenyl)-ethyl, 2-(2-cyclohexenyl)-ethyl, 2-(3-cyclohexenyl)-ethyl, 1-(1-cyclopentenyl)-propyl, 1-(3-cyclopentenyl)-propyl, 2-(2-cyclopentenyl)-propyl, 2-(3-cyclopentenyl)-propyl, 3-(1-cyclopentenyl)-propyl, 4-(3-cyclopentenyl)-butyl, 1-(2-cyclohexenyl)-propyl, 1-(3-cyclohexenyl)-propyl, 2-(1-cyclohexenyl)-propyl, 3-(3-cyclohexenyl)-propyl, 4-(3-cyclohexenyl)-butyl and the like, cycloalkyl-lower alkenyl, in which cycloalkyl has from three to eight, preferably from five to six, ring carbon atoms, e.g. 3-cyclopentylallyl, 3-cyclohexylallyl, 4-cyclopentyl-2-butenyl and the like, or cycloalkenyl-lower alkenyl, in which cycloalkenyl has from two to eight, preferably from five to six, ring carbon atoms, e.g. 3-(1-cyclopentenyl)-allyl, 3-(2-cyclohexenyl)-allyl, 4-(3-cyclohexenyl)-2-butenyl and the like, or any other cycloaliphatic-aliphatic radical.

A carbocyclic aryl radical $R_2$ is more especially a monocyclic carbocyclic aryl radical, e.g. phenyl or substituted phenyl, as well as a bicyclic carbocyclic aryl radical such as naphthyl, e.g. 1-naphthyl or 2-naphthyl, or substituted naphthyl. One or more than one of the same or of different substituents may be attached to any of the positions available for substitution; suitable groups are, for example, lower alkyl, e.g. methyl, ethyl, n-propyl, isopropyl and the like, lower alkoxy, e.g. methoxy, ethoxy, n-propyloxy, isopropyloxy and the like, halogeno, e.g. fluoro, chloro, bromo and the like, trifluoromethyl or any other suitable substituent.

A carbocyclic aryl-aliphatic radical representing an organic group $R_2$ is primarily a monocyclic or a bicyclic carbocyclic aryl-lower alkyl radical, in which lower alkyl is a lower alkylene radical having from one to three carbon atoms, e.g. methylene, 1,1-ethylene, 1,2-ethylene, 1-methyl-1,2-ethylene, 2-methyl-1-2-ethylene, or 1,3-propylene. A carbocyclic aryl-aliphatic radical is, therefore, represented by phenyl-lower alkyl, e.g. benzyl, 1-phenylethyl, 2-phenylethyl, 3-phenylpropyl and the like, as well as naphthyl-lower alkyl, e.g. 1-naphthyl-methyl, 2-(1-naphthyl)-ethyl, 2-naphthylmethyl, 1-(2-naphthyl)-ethyl and the like, or phenyl-lower alkyl and naphthyl-lower alkyl, in which phenyl and naphthyl are substituted in any of the positions available for substitution by one or more than one of the same or different substituents, such as lower alkyl, e.g. methyl, ethyl, n-propyl, isopropyl and the like, lower alkoxy, e.g. methoxy, ethoxy, n-propyloxy and the like, halogeno, e.g. fluoro, chloro, bromo and the like, trifluoromethyl or any other suitable substituent. A monocyclic or bicyclic carbocyclic aryl-aliphatic radical is also a phenyl-lower alkenyl or a naphthyl-lower alkenyl radical, e.g. 2-phenylallyl, 3-phenylallyl, 3-(1-naphthyl)-allyl, 3-(2-naphthyl)-allyl and the like, or phenyl-lower alkenyl and naphthyl-lower alkenyl, in which phenyl and naphthyl are substituted as shown hereinbefore.

A heterocyclic aryl radical $R_2$ is more especially a monocyclic azacyclic aryl group, such as pyridyl, e.g. 2-pyridyl, 4-pyridyl and the like, a monocyclic oxacyclic aryl group, such as furyl, e.g. 2-furyl and the like a monocyclic thiacyclic aryl group, such as thienyl, e.g. 2-thienyl and the like, or any other analogous heterocyclic aryl radical. These groups may also contain substituents, such as lower alkyl, e.g. methyl, ethyl, isopropyl and the like, lower alkoxy, e.g. methoxy, ethoxy and the like, halogeno, e.g. fluoro, chloro, bromo and the like, or any other suitable substituent.

A heterocyclic aryl-aliphatic radical representing the organic group $R_2$ is particularly a monocyclic heterocyclic aryl-aliphatic group, such as a monocyclic azacyclic aryl-lower alkyl radical, for example, pyridyl-lower alkyl, e.g. 2-pyridymethyl, 4-pyridylmethyl 2-(2-pyridyl)-ethyl and the like, a monocyclic oxacyclic aryl-lower alkyl radical, for example, furyl-lower alkyl, e.g. furfuryl and the like, a monocyclic thiacyclic aryl-lower alkyl-radical, for example, thienyl-lower alkyl, e.g. 2-thenyl and the like, or any other suitable heterocyclic aryl-aliphatic radical, in which the monocyclic heterocyclic aryl group is substituted by one or more than one of the same or different substituents, such as lower alkyl, e.g. methyl, ethyl, isopropyl and the like, lower alkoxy, e.g. methoxy, ethoxy and the like, halogeno, e.g. fluoro, chloro, bromo and the like, or any other suitable substituent.

Another organic group representing $R_2$ is an acyl group particularly the acyl group of an organic carboxylic acid. The latter is, for example, an aliphatic carboxylic acid, such as a lower alkanoic acid having from two to seven carbon atoms, e.g. acetic, propionic, pivalic acid and the like, a cycloaliphatic carboxylic acid, such as a cycloalkane carboxylic acid, in which cycloalkane has from three to eight, preferably from five to seven, ring carbon atoms, e.g. hexahydrobenzoic acid and the like, a cycloaliphatic-aliphatic carboxylic acid, such as a cycloalkyl-lower alkanoic acid, in which cycloalkyl has from three to eight, preferably from six to seven, ring carbon atoms, e.g. cyclohexylacetic, 3-cyclopentylpropionic acid and the like, a carbocyclic aryl carboxylic acid, such as a monocylic or a bicyclic carbocyclic aryl carboxylic acid, e.g. benzoic, 1-naphthoic, or 2-naphthoic acid, as well as a lower alkyl-benzoic acid, e.g. 4-methyl-benzoic, 2-ethyl-benzoic, 4-isopropyl-benzoic acid and the like, an etherified hydroxy-benzoic acid, for example, a lower alkoxy-benzoic acid, e.g. 4-methoxy-benzoic, 3,4-dimethoxy-benzoic, 3,4,5-trimethoxy-benzoic, 2-theoxy-benzoic acid and the like, an esterified hydroxy-benzoic acid, such as a lower alkoxy-carbonyloxy-benzoic acid, e.g. 3-methoxycarbonyloxy-benzoic, 4-ethoxycarbonyloxy-benzoic acid and the like, a lower alkanoyloxy-benzoic acid, e.g. 4-acetyloxy-benzoic acid and the like, or a halogeno-benzoic acid (halogeno representing a hydroxyl group esterified with a hydrohalic acid), e.g. 4-fluoro-benzoic, 3,4-dichloro-benzoic, 3-bromo-benzoic acid and the like, a nitro-benzoic acid, e.g. 3-nitro-benzoic acid and the like, an amino-benzoic acid such as an N,N-di-lower alkylamino-benzoic acid, e.g. N,N-dimethylamino-benzoic acid and the like, a carbocyclic aryl-aliphatic carboxylic acid, such as a monocyclic or a bicyclic carbocyclic aryl-lower alkanoic or alkenokic acid, such as a phenyl-lower alkanoic acid, e.g. phenylacetic, 3-phenylpropionic acid and the like, or a phenyl-lower alkenoic acid, e.g. cinnamic, 3,4,5-trimethoxy-cinnamic acid and the like, a heterocyclic aryl carboxylic acid, such as a monocyclic azacyclic aryl carboxylic acid, for example, a pyridine carboxylic acid, e.g. nicotinic, isonicotinic acid and the like, a monocyclic oxacyclic aryl carboxylic acid, for example, a furoic acid, e.g. 2-furoic acid and the like, a monocyclic thiacyclic aryl carboxylic acid, for example, a thienoic acid, e.g. 2-thienoic aicd and the like, or a heterocyclic aryl aliphatic carboxylic acid, such as a monocyclic azacyclic aryl-lower alkanoic acid, for example, a pyridyl-lower alkanoic acid, e.g. 2-pyridyl acetic acid, 3-(4-pyridyl)-propionic acid and the like, or any other suitable organic carboxylic acid.

Each of the groups $R_3$, $R_4$, $R_5$, $R_6$ and $R_7$ stands primarily for hydrogen. However, each may also stand for an aliphatic radical, particularly lower alkyl having from one to four carbon atoms, e.g. methyl, ethyl, n-propyl, isopropyl, n-butyl and the like, or any other suitable aliphatic radical, such as a substituted aliphatic, particularly lower alkyl radical, for example, phenyl-lower alkyl, e.g. benzyl, 1-phenylethyl 2-phenylethyl and the like.

Salts of the compounds of this invention are primarily pharmaceutically acceptable, non-toxic acid addition salts with inorganic or organic acids, for example, mineral acids, e.g. hydrochloric, hydrobromic, sulfuric, phosphoric acids and the like, organic carboxylic acids, e.g. formic, acetic, propionic, pivalic, glycolic, lactic, malonic, succinic, maleic, malic, tartaric citric, benzoic, cinnamic, mandelic, salicylic, 4-amino-salicylic, 2-phenoxy-benzoic, 2-acetoxybenzoic, nicotinic, isonicotinic acid and the like, or any other suitable carboxylic acid, as well as organic sulfonic acids, e.g. methane sulfonic, ethane sulfonic, ethane 1,2-disulfonic, 2-hydroxyethane sulfonic, p-toluene sufonic acid and the like, or any other suitable acid. Salts, which may be prepared primarily for identification purposes, are for example, those with acidic organic nitro compounds, e.g. picric, picrolonic, flavianic acid and the like, or metal complex acids, e.g. phosphotungstic, phosphomolybdic, chloroplatinic, Reinecke acid and the like. Mono- or poly-salts may be formed, depending on the number of salt-forming groups and/or the conditions used for the salt formation.

Quaternary ammonium compounds of the compounds of this invention may be either mono- or poly-quaternary ammonium compounds, depending on the number of tertiary amino groups present and/or the conditions of the quaternization reaction. Quaternary ammonium compounds are particularly those with lower aliphatic hydrocarbon halides, sulfates or sulfonates, such as lower alkyl halides, e.g. methyl, ethyl, n-propyl or isopropyl chloride, bromide, iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate, or lower alkyl lower hydroxy-alkane sulfonates, e.g. methyl 2-hydroxy-ethane sulfonate and the like, or lower alkyl monocyclic carbocyclic aryl sulfoniates, e.g. methyl or ethyl p-toluene sulfonate and the like, as well as those with carbocyclic aryl-aliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the salts of such hydroxides with acids, particularly with the organic carboxylic acids mentioned hereinabove.

Also included within the scope of the present invention are the N-oxides of the aforementioned compounds, as well as the pharmaceutically acid addition salts of such N-oxides, for example, those with the above-mentioned acids.

The compounds of this invention may be present in the form of their racemates or as the optically active antipodes.

The compounds of this invention have pharmacological properties and can be used accordingly. For example, they show sedative and tranquilizing effects and can serve as sedative and tranquilizing agents in the treatment of hyperactivity, agitation and the like. They also exhibit antihypertensive properties and can, therefore, be used to lower the blood pressure in hypertensive conditions. Furthermore, they exhibit antihistaminic and spasmolytic effects, which can be utilized to relieve conditions caused by an excess release of histamine, spasms and the like. In addition, compounds of this invention show analgesic properties and are useful in raising the threshold of pain. Compounds of this invention, particularly the quaternary ammonium derivatives thereof, also have ganglionic blocking effects and can be utilized as ganglionic blockers in the treatment of certain types of high blood pressure conditions. In addition, compounds of this invention show antibacterial and fungicidal properties and are used in the treatment of bacterial and fungal infections of plants and mammals.

Particularly useful as pharmacologically active compounds are those of the following formulae:

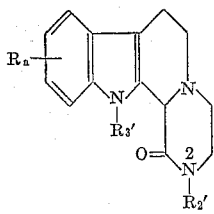

and

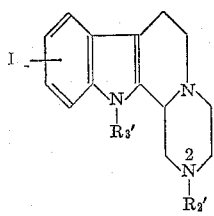

in which $R_2'$ stands for hydrogen, lower alkyl having from one to four carbon atoms, N,N-di-lower alkyl-amino-lower alkyl, in which lower alkyl separates N,N-di-lower alkylamino from the ring-nitrogen atom representing the 2-position in the ring system by from two to three carbon atoms, N,N-alkylene-imino-lower alkyl, in which alkylene has from four to seven carbon atoms, and lower alkyl separates N,N-alkylene-imino from the ring-nitrogen atom representing the 2-position in the ring system by from two to three carbon atoms, (4-lower alkyl-1-piperazino)-lower alkyl, in which lower alkyl separates 4-lower alkyl-1-piperazino from the ring-nitrogen atom representing the 2-position in the ring system by from two to three carbon atoms, (4-morpholino)-lower alkyl, in which lower alkyl separates 4-morpholino from the ring-nitrogen atom representing the 2-position in the ring system by from two to three carbon atoms, cycloalkyl having from five to seven ring carbon atoms, cycloalkyl-lower alkyl, in which cycloalkyl has from five to seven ring carbon atoms and lower alkyl has from one to four carbon atoms, phenyl, lower alkyl-phenyl, in which lower alkyl has from one to four carbon atoms, lower alkoxy-phenyl, in which lower alkoxy has from one to four carbon atoms, halogeno-phenyl, phenyl-lower alkyl, in which lower alkyl has from one to four carbon atoms, (lower alkyl-phenyl)-lower alkyl, (lower alkoxy-phenyl)-lower alkyl or (halogeno-phenyl)-lower alkyl, $R_3'$ stands for hydrogen, lower alkyl having from one to four carbon atoms, or phenyl-lower alkyl, in which lower alkyl has from one to four carbon atoms, and $R_a$ represents hydrogen, lower alkyl having from one to four carbon atoms, lower alkoxy having from one to four carbon atoms, halogeno having atomic weight below 80, and trifluoromethyl, the pharmaceutically acceptable acid addition salts thereof and the lower alkyl quaternary ammonium chlorides, sulfates and sulfonates thereof.

The new compounds of this invention may be used in the form of pharmaceutical preparations, which contain the new compounds in admixture with a pharmaceutical organic or inorganic, solid or liquid vehicle suitable for enteral or parenteral administration. For making up the preparations there may be used substances, which do not react with the new compounds, such as water, gelatine, lactose, starches, lactic acid, stearic acid, magnesium stearate, stearyl alcohol, talc, vegetable oils, benzyl alcohols, gums, propylene glycol, polyalkylene glycols, or any other known carrier used for pharmaceutical preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other pharmacologically useful substances.

Compounds of this invention may be prepared, for example, by reacting a compound of the formula:

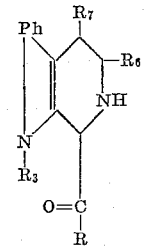

in which Ph, $R_3$, $R_6$ and $R_7$ have the previously-given meaning, and R stands for an etherified hydroxyl or an etherified mercapto group, with an ethylene-imine of the formula:

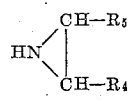

and, if desired, replacing in a resulting compound of the formula:

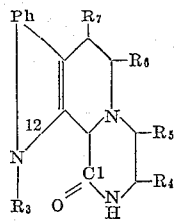

the carbonyl group representing the 1-position of the ring system by methylene, and/or, if desired, replacing in a resulting compound of the formula:

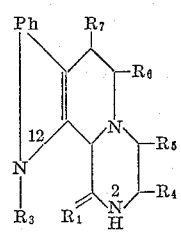

in which Ph, $R_1$, $R_3$, $R_4$, $R_5$, $R_6$ and $R_7$ have the previously-given meaning, the hydrogen attached to the ring nitrogen atom representing the 2-position in the ring system by an organic radical, and/or, if desired, replacing in a resulting compound, in which $R_3$ stands for hydrogen, the latter by an aliphatic radical, and/or, if desired, converting a resulting salt into the free compound or into another salt, and/or, if desired, converting a resulting compound into an N-oxide or into a quaternary ammonium derivative thereof, and/or, if desired, converting a resulting compound or an N-oxide into a salt thereof, and/or, if desired, converting a resulting quaternary ammonium derivative into another quaternary ammonium derivative and/or, if desired, separating a resulting mixture of isomers into the single isomers.

An etherified hydroxyl group is more especially a lower alkoxy group, e.g. methoxy, ethoxy, isopropyloxy, tertiary butyloxy and the like; it may also represent a phenyl-lower alkoxy group, e.g. benzyloxy and the like, or a 2-tetrahydropyranyloxy group or any other suitable etherified hydroxyl group. An etherified mercapto group is more especially a lower alkyl-mercapto group, e.g. methylmercapto, ethylmercapto and the like, as well as phenyl-lower alkyl-mercapto, e.g. benzylmercapto and the like, or any other suitable etherified mercapto group.

Reaction of the starting material with the ethyleneimine compound, particularly ethyleneimine itself, is carried out in the presence of an inert solvent, such as a lower alkanol, e.g. methanol, ethanol, isopropanol and the like, an ether, e.g. tetrahydrofuran, p-dioxane and the like, or any other suitable inert solvent or solvent mixture. The addition of a small amount of an acid addition salt, e.g. the hydrochloride and the like, of the starting material, may enhance the yield of the desired product, and/or the rate of the reaction. The reaction occurs more readily at an elevated temperature, if necessary, in a closed vessel, and/or in the atmosphere of an inert gas, e.g. nitrogen and the like.

The starting materials used in the above reaction are known or may be prepared according to known methods.

The compounds of this invention may also be prepared, for example, by ring closing a compound of the formula:

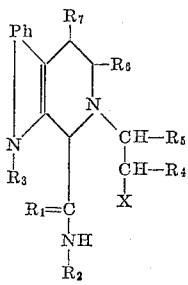

in which Ph, $R_1$, $R_2$, $R_3$, $R_4$, $R_5$, $R_6$ and $R_7$ have the previously-given meaning, and X stands for a reactive esterified hydroxyl group, or a salt thereof, and, if desired, replacing in a resulting compound, in which $R_1$ stands for oxo, the oxo group by two hydrogen atoms, and/or, if desired, replacing in a compound, in which $R_2$ stands for hydrogen, the latter by an organic radical, and/or, if desired, carrying out the other, previously-described, optional steps.

In the above starting materials, the esterified hydroxyl group X stands primarily for halogeno (representing a hydroxyl group esterified with a hydrohalic acid) e.g. chloro, bromo and the like, as well as a sulfonyloxy group, e.g. p-toluene sulfonyloxy and the like. Ring closure is carried out according to known methods which depend primarily on the nature of the group $R_1$. Thus, whenever $R_1$ represents an oxo group =O, ring closure may be achieved by treatment with a base, such as an alkali metal hydroxide, e.g. potassium hydroxide and the like, or any equivalent base, preferably in the presence of a suitable diluent, such as a lower alkanol, e.g. ethanol and the like, or any other suitable solvent. The reaction occurs at room temperature, but may be completed at an elevated temperature, if necessary, in a closed vessel and/or in the atmosphere of an inert gas, e.g. nitrogen and the like.

In the case of $R_1$ representing two hydrogen atoms H(H), ring closure is achieved by heating the starting material in an inert solvent, such as a hydrocarbon, e.g. benzene, toluene and the like, or any other suitable diluent, if necessary, in the presence of a base, such as a metal salt of an organic acid, e.g. sodium acetate and the like, or any other suitable inorganic or organic base. The reaction is carried out at room temperature or at an elevated temperature, if necessary, in a closed vessel and/or in the atmosphere of an inert gas, e.g. nitrogen and the like.

The starting materials used in the above reaction may be prepared, for example, by reacting a compound of the formula:

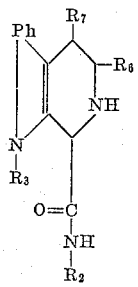

in which Ph, $R_2$ and $R_3$ have the previously-given meaning, with a reactive diester of a glycol of the formula:

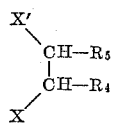

in which $R_4$ and $R_5$ have the previously-given meaning, and X and X' stand for a reactive esterified hydroxyl group, especially with an ethylene 1,2-dihalide, such as 2-chloro-ethyl bromide and the like. This reaction is preferably carried out in the presence of a base, such as sodium acetate and the like, and a suitable solvent, such as a lower alkanol, e.g. ethanol and the like, if necessary, at an elevated temperature, and/or in the atmosphere of an inert gas, e.g. nitrogen. In the resulting compound of the formula:

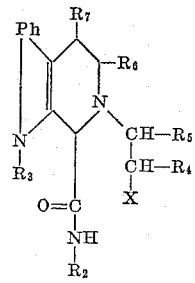

in which Ph, $R_2$, $R_3$, $R_4$, $R_5$, $R_6$, $R_7$ and X have the previously-given meaning, the carbonyl portion of the amide group may be converted into a methylene group. This may be achieved, for example, by treatment with a suitable complex hydride, e.g. lithium aluminum hydride and the like, if necessary, in the presence of an activator, e.g. aluminum chloride and the like; suitable solvents used in the above reduction are ethers, e.g. diethyl ether, tetrahydrofuran and the like, or a mixture of such ether with another solvent, for example, a mixture of tetrahydrofuran and methylene chloride and the like. The reaction is carried out at an elevated temperature, if necessary, in the atmosphere of an inert gas, e.g. nitrogen, and the like.

The compounds of this invention may also be prepared, for example, by reacting a compound of the formula:

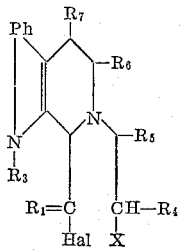

in which Ph, $R_1$, $R_3$, $R_4$, $R_5$, $R_6$, $R_7$ and X have the previously-given meaning, and Hal stands for halogeno, with an amine of the formula $R_2-NH_2$, in which $R_2$ has the previously-given meaning, and, if desired, carrying out the previously-described optional steps.

Treatment of the starting material, in which Hal stands primarily for chloro, with the amine is carried out according to known methods, preferably at an elevated temperature and in a suitable solvent, such as benzene and the like, if necessary, in the presence of an inorganic or organic base (which may also be furnished by an excess of the amine), such as, for example, sodium acetate and the like. The ring closure is achieved while cooling, at room temperature or at an elevated temperature, if necessary, in a closed vessel and/or in the atmosphere of an inert gas, e.g. nitrogen and the like.

The starting material is prepared according to known methods; for example, a compound of the formula:

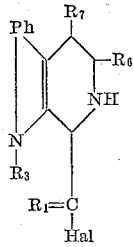

in which Ph, $R_1$, $R_3$, $R_6$, $R_7$ and Hal have the previously-given meaning, with a reactive diester of a glycol of the formula:

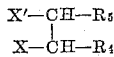

in which $R_4$, $R_5$, X and X' have the previously-given meaning, particularly with an ethylene 1,2-halide, such as 2-chloro-ethyl bromide and the like, according to the previously-described method.

Compounds of this invention having the previously-given formula, in which $R_1$ represents two hydrogen atoms H(H) and $R_5$ stands for hydrogen, may also be prepared by treating a compound of the formula:

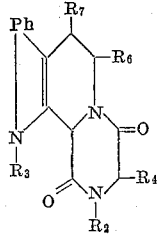

in which Ph, $R_3$, $R_6$ and $R_7$ have the previously-given meaning, with a reducing reagent capable of converting the carbonyl portion of the amide groupings into methylene, and, if desired, carrying out the previously-described, optional steps.

The above reduction of the carbonyl groups to the methylene groups is carried out, for example, as previously-shown, i.e. by treatment of the starting material with a suitable complex hydride, such as an alkali metal aluminum hydride, e.g. lithium aluminum hydride and the like, which may be used in the presence of an activator, e.g. aluminum chloride and the like. The complex hydride reduction is preferably carried out at an elevated temperature and in the presence of a solvent, such as an ether, e.g. diethyl ether, tetrahydrofuran and the like, or a mixture of an ether in admixture with another suitable diluent, such as methylene chloride and the like, preferably at an elevated temperature and, if necessary, in the atmosphere of an inert gas, e.g. nitrogen. The conversion of the carbonyl into methylene groups may also be carried out by other methods, for example, by treatment with hydrogen in the presence of a suitable catalyst, such as a copper chromite catalyst and the like, by electrolytic reduction, or any other known method.

The starting material may be prepared, for example, by treatment of a compound of the formula:

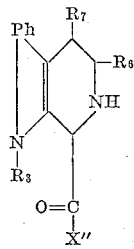

in which Ph, $R_3$, R and $R_7$ have the previously-given meaning and X" represents halogeno, particularly chloro, or an amino group of the formula $R_2$—NH—, in which $R_2$ has the previously-given meaning, with a halogenoacetic acid halide of the formula:

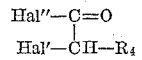

in which $R_4$ has the previously-given meaning, and Hal' and Hal" represent halogeno, particularly chloro, and ring-closing a resulting compound of the formula:

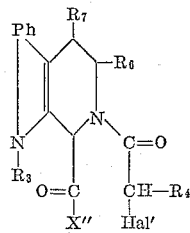

in which Ph, $R_3$, $R_4$, $R_6$, $R_7$, X" and Hal' have the previously-given meaning.

Treatment of the starting material with the halogenoacetic acid halide is carried out in the presence of a suitable diluent, such as p-dioxane, diethylene glycol dimethylether and the like, preferably at an elevated temperature, and, if necessary, in the atmosphere of an inert gas, e.g. nitrogen; the desired intermediate does not necessarily have to be isolated.

Whenever X" in the intermediate represents a halogeno atom, ring closure of the intermediate is achieved by treatment with an amine of the formula $R_2$—$NH_2$, in which $R_2$ has the previously-given meaning, if necessary, in the presence of a suitable inorganic or organic base, and/or a diluent. Ring closure of an intermediate, in which X" stands for an amino group of the formula $R_2$—NH—, in which $R_2$ has the previously-given meaning, is accomplished by treatment with a base, for example, with an alkali metal hydroxide, e.g. sodium hydroxide and the like, preferably in the presence of a suitable solvent such as a lower alkanol, e.g. ethanol and the like. The ring closure is carried out under cooling, at room temperature or at an elevated temperature, and, if necessary, in a closed vessel and/or in the atmosphere of an inert gas, e.g. nitrogen.

In a compound, which results from one of the above procedures, and in which $R_1$ stands for oxo, such oxo group may be replaced by two hydrogen atoms; this may be achieved according to one of the above reduction methods, for example, by treatment with a complex hydride, e.g. lithium aluminum hydride and the like.

In a resulting compound, in which $R_2$ represent hydrogen, such hydrogen may be replaced by an organic radical. This replacement may be carried out according to known methods, for example, by forming an alkali metal, e.g. sodium, potassium, derivative (by treatment with a suitable reagent, such as an alkali metal hydride and the like) and reacting such derivative with a reactive ester of an organic hydroxyl compound (such as a suitable organic halide compound). During the conversion of a hydrogen representing $R_2$ into an organic radical, a hydrogen $R_3$ attached to the indole-nitrogen may have to be protected temporarily, for example, by a group which later can be split off by hydrogenolysis. Suitable groups of that type are carbobenzoxy, trityl and the like; they are split off by treatment with hydrogen in the presence of a suitable catalyst.

In a resulting compound a hydrogen atom $R_3$ may be replaced by an aliphatic radical according to known methods. Replacement may be achieved, for example, by forming an alkali metal derivative (according to the previously-described method) and reacting the alkali metal compound with a reactive esterified aliphatic hydroxyl compound, particularly an aliphatic halide, as well as an aliphatic sulfonate.

The compounds of this invention may be obtained in the form of the free bases or as the salts thereof. A salt may be converted into the free base, for example, by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, or any other suitable alkaline reagent, as well as an anion exchange resin and the like. A free base may be converted into its acid addition salts by reacting the former with one of the organic acids mentioned hereinbefore. The salt-forming reaction may be carried out, for example, by treating a solution of the free base in an inert solvent, or in a solvent mixture with the acid or a solution thereof and isolating the desired salt. A salt may also be converted into another salt, for example, by treating it with the metal salt, such as an alkali metal, e.g. sodium, potassium and the like, salt of an acid, in the presence of a suitable solvent. Salts may be obtained as hemihydrates, monohydrates, sesquihydrates or polyhydrates depending on the conditions used in the formation of the salts.

N-oxides of the compounds of the present invention may be prepared according to known methods, for example, by treating a solution of the resulting compound containing a tertiary nitrogen atom or a salt thereof in a suitable inert solvent with an N-oxidizing reagent, such as, for example, ozone, hydrogen peroxide, an inorganic peracid, e.g. persulfuric acid and the like, an organic persulfonic acid, e.g. p-toluene persulfonic acid and the like, or primarily an organic percarboxylic acid, e.g. peracetic acid, perbenzoic acid, monoperphthalic acid and the like. The N-oxides may be obtained in the form of the free bases or the acid addition salts thereof; N-oxide free bases may be converted into their acid addition salts or the salts may be converted into the free N-oxide bases according to the previously-described procedures. Mono- or poly-N-oxides may be obtained depending on the number of tertiary amino groups present.

The quaternary ammonium compounds of the compounds of this invention may be obtained, for example, by reacting the tertiary base with an ester formed by a hydroxylated compound and a strong inorganic or organic acid, such as a mineral acid, e.g. hydrochloric, hydrobromic, hydriodic, sulfuric acid and the like, or a strong organic acid, such as a lower alkane sulfonic acid, e.g. methane sulfonic, ethane sulfonic acid and the like, hydroxyl-lower alkane sulfonic acid, e.g. 2-hydroxy-ethane sulfonic acid and the like, a monocyclic carboxylic aryl sulfonic acid, e.g. p-toluene sulfonic acid and the like. Reactive esters are, for example, lower alkyl halides, e.g. methyl, ethyl, n-propyl or isopropyl chloride, bromide, iodide and the like, phenyl-lower alkyl halides, e.g. benzyl, 1-phenylethyl or 2-phenylethyl chloride, bromide or iodide and the like, lower alkyl lower alkane sulfonates, e.g. methyl methane sulfonate, methyl ethane sulfonate, ethyl methane sulfonate, ethyl ethane sulfonate and the like, lower alkane hydroxy-lower alkane sulfonate, e.g. methyl 2-hydroxyethane sulfonate, ethyl 2-hydroxy-ethane sulfonate and the like, or lower alkyl monocyclic carbocyclic aryl sulfonate, e.g. methyl p-toluene sulfonate and the like. The quaternizing reactions may be performed in the absence or presence of an inert solvent, if necessary, while cooling or heating, in a closed vessel, and/or in the atmosphere of an inert gas, e.g. nitrogen and the like.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium hydroxide there may be obtained quaternary ammonium salts by reacting the base with acids, for example, those used for the preparation of acid addition salts. A quaternary ammonium compound may also be converted directly into another quaternary ammonium salt without the formation of an intermediate quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be isolated as hydrates; depending on the number of tertiary amino groups present in the molecule and/or the conditions for their formation, mono- or poly-quaternary ammonium compounds may be formed.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to the final products mentioned in the beginning as preferred embodiments of the invention.

The following examples are intended to illustrate the invention and are not to be construed as being limitations thereon. Temperatures are given in degrees centigrade.

*Example 1*

To a solution of 3.8 g. of 1-carbethoxy-1,2,3,4-tetrahydro-β-carboline in 25 ml. of ethanol is added 0.04 g. of 1 - carbethoxy-1,2,3,4-tetrahydro-β-carboline hydrochloride; the mixture is heated to 50° to effect complete solution. To the latter is added dropwise 0.67 g. of ethyleneimine in 10 ml. of ethanol. The reaction mixture is refluxed for 24 hours and then chilled. The resulting yellow crystalline precipitate is recrystallized from ethanol to yield the pure 1-oxo-1,2,3,4,6,7,12,12b-octahydro-2-aza-indolo[2,3-a]quinolizine of the formula:

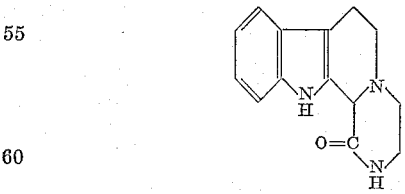

which melts at 234–235°.

Other compounds which may be prepared according to the above method are 3-methyl-1-oxo-1,2,3,4,6,7,12,12b-octahydro-2-aza-indolo[2,3-a]quinolizine,
9-methoxy-1-oxo-1,2,3,4,6,7,12,12b-octahydro-2-aza-indolo[2,3-a]quinolizine,
10-methoxy-1-oxo-1,2,3,4,6,7,12,12b-octahydro-2-aza-indolo[2,3-a]quinolizine,
9,10-methylenedioxy-1-oxo-1,2,3,4,6,7,12,12b-octahydro-2-aza-indolo[2,3-a]quinolizine,
9-chloro-1-oxo-1,2,3,4,6,7,12,12b-octahydro-2-aza-indolo[2,3-a]quinolizine, 8,11-dichloro-1-oxo-1,2,3,4,6,7,12,12b-octahydro-2-aza-indolo[2,3-a]quinolizine,
10-fluoro-1-oxo-1,2,3,4,6,7,12,12b-octahydro-2-aza-indolo[2,3-a]quinolizine,
8-methyl-1-oxo-1,2,3,4,6,7,12,12b-octahydro-2-aza-indolo[2,3-a]quinolizine,
8-methyl-1-oxo-1,2,3,4,6,7,12,12b-octahydro-2-aza-indolo[2,3-a]quinolizine,
7-methyl-1-oxo-1,2,3,4,6,7,12,12b-octahydro-2-aza-indolo[2,3-a]quinolizine and the like.

*Example 2*

To a solution of 0.2 g. of 1-oxo-1,2,3,4,6,7,12,12b-octahydro-2-aza-indolo[2,3-a]quinolizine in 150 ml. of tetrahydrofuran and 50 ml. of methylene chloride is added 0.12 g. of lithium aluminum hydride, and the reaction mixture is refluxed overnight. The complex is decomposed by adding 2 ml. of water; the solid material is filtered off and washed with a small amount of ethanol. The combined filtrates are dried, the solvents are evaporated, and the solid 1,2,3,4,6,7,12,12b-octahydro-2-aza-indolo[2,3-a]quinolizine of the formula:

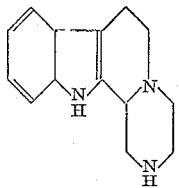

is recrystallized from ethanol, M.P. 126–128°.

Other compounds which may be prepared according to the above procedure are, for example, 3-methyl-1,2,3,4,6,7,12,12b-octahydro-2-aza-indolo[2,3-a]quinolizine,
9-methoxy-1,2,3,4,6,7,12,12b-octahydro-2-aza-indolo[2,3-a]quinolizine,
10-methoxy-1,2,3,4,6,7,12,12b-octahydro-2-aza-indolo[2,3-a]quinolizine,
9,10-methylenedioxy-1,2,3,4,6,7,12,12b-octahydro-2-aza-indolo[2,3-a]quinolizine,
9-chloro-1,2,3,4,6,7,12,12b-octahydro-2-aza-indolo[2,3-a]quinolizine,
8,11-dichloro-1,2,3,4,6,7,12,12b-octahydro-2-aza-indolo[2,3-a]quinolizine,
10-fluoro-1,2,3,4,6,7,12,12b-octahydro-2-aza-indolo[2,3-a]quinolizine,
8-methyl-1,2,3,4,6,7,12,12b-octahydro-2-aza-indolo[2,3-a]quinolizine,
7-methyl-1,2,3,4,6,7,12,12b-octahydro-2-aza-indolo[2,3-a]quinolizine and the like.

Additional compounds which may be prepared according to the previously-described procedures are, for example, 2-methyl-1-oxo-1,2,3,4,6,7,12,12b-octahydro-2-aza-indolo[2,3-a]quinolizine,
12-ethyl-1-oxo-1,2,3,4,6,7,12,12b-octahydro-2-aza-indolo[2,3-a]quinolizine,
2,12-dimethyl-1-oxo-1,2,3,4,6,7,12,12b-octahydro-2-aza-indolo[2,3-a]quinolizine,
2-benzyl-1-oxo-1,2,3,4,6,7,12,12b-octahydro-aza-indolo[2,3-a]quinolizine,
2-cyclopentylmethyl-1-oxo-1,2,3,4,6,7,12,12b-octahydro-2-aza-indolo[2,3-a]quinolizine,
2-(2-N,N-dimethylaminoethyl)-1-oxo-1,2,3,4,6,7,12,12b-octahydro-2-aza-indolo[2,3-a]quinolizine,
2-[2-(1-pyrrolidino)-ethyl]-12-methyl-1-oxo-1,2,3,4,6,7,12,12b-octahydro-2-aza-indolo[2,3-a]quinolizine,
2-isopropyl-10-methoxy-1-oxo-1,2,3,4,6,7,12,12b-octahydro-2-aza-indolo[2,3-a]quinolizine,
2-methyl-1,2,3,4,6,7,12,12b-octahydro-2-aza-indolo[2,3-a]quinolizine,
2,12-dimethyl-1,2,3,4,6,7,12,12b-octahydro-2-aza-indolo[2,3-a]quinolizine,
12-ethyl-1,2,3,4,6,7,12,12b-octahydro-2-aza-indolo[2,3-a]quinolizine,
12-benzyl-1,2,3,4,6,7,12,12b-octahydro--aza-indolo[2,3-a]quinolizine,
2-(4-chloro-benzyl)-1,2,3,4,6,7,12,12b-octahydro-2-aza-indolo[2,3-a]quinolizine,
2-(2-N,N-diethylaminoethyl)-1,2,3,4,6,7,12,12b-octahydro-2-aza-indolo[2,3-a]quinolizine.
2-[3-(1-piperidino)-propyl-1,2,3,4,6,7,12,12b-octahydro-2-aza-indolo[2,3-a]quinolizine,
9-chloro-2-methyl-1,2,3,4,6,7,12,12b-octahydro-2-aza-indolo[2,3-a]quinolizine,
6-ethyl-2-phenyl-1,2,3,4,6,7,12,12b-octahydro-2-aza-indolo[2,3-a]quinolizine,
2-(2-methoxyethyl)-1,2,3,4,6,7,12,12b-octahydro-2-aza-indolo[2,3-a]quinolizine and the like.

Mixtures of isomers of resulting compounds may be separated into single isomers according to known methods. For example, racemates of the compounds of this invention may be resolved into the optically active d- and l- forms according to procedures used for the resolution of racemic compounds. For example, a solution of the free base of a racemic d,l-compound may be treated one of the optically active forms of a suitable acid containing an asymmetric carbon atom, or a solution thereof, whereupon a salt can be isolated, which is formed by the optically active acid with one of the optically active forms of the base. Suitable acids for the resolution of racemates are D-tartaric acid (l-tartaric acid) or L-tartaric acid (d-tartaric acid), as well as the optically active forms of di-o-toluyl-tartaric acid, malic acid, mandelic acid, camphor 10-sulfonic acid, quinic acid and the like. From a resulting salt, the free and optically active base may be obtained according to process for the conversion of a salt into a base described above. An optically active base may be converted into a salt, a quaternary ammonium compound, an N-oxide or a salt of an N-oxide as described hereinbefore.

What is claimed is:

1. A member selected from the group consisting of a compound of the formula:

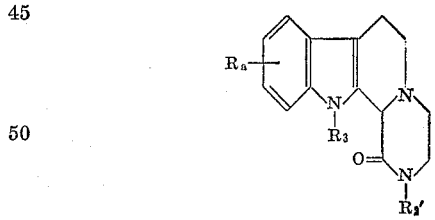

in which $R_2'$ stands for a member selected from the group consisting of hydrogen, lower alkyl, N,N-di-lower alkyl-amino-lower alkyl, N,N-alkylene-imino-lower alkyl, in which alkylene has from four to six carbon atoms, (4-lower alkyl-1-piperazino)- lower alkyl, (4-morpholino)-lower alkyl, cycloalkyl having from three to eight ring carbon atoms, cycloalkenyl having from five to eight ring carbon atoms, cycloalkyl-lower alkyl, in which cycloalkyl has from three to eight ring carbon atoms, cycloalkenyl-lower alkyl, in which cycloalkenyl has from five to eight ring carbon atoms, phenyl, lower alkyl-phenyl, lower alkoxy-phenyl, halogeno-phenyl, phenyl-lower alkyl, (lower alkyl-phenyl)-lower alkyl, (lower alkoxy-phenyl)-lower alkyl and (halogeno-phenyl)-lower alkyl, $R_3'$ stands for a member selected from the group consisting of hydrogen, lower alkyl and phenyl-lower alkyl, and $R_a$ is a member selected from the group consisting of hydrogen, lower alkyl, lower alkoxy, lower alkylenedioxy, halogeno and trifluoromethyl, and a pharmaceutically acceptable acid addition salt thereof.

2. A member selected from the group consisting of a compound of the formula:

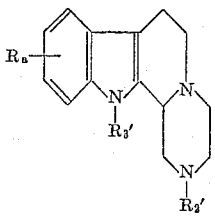

in which $R_2'$ stands for a member selected from the group consisting of hydrogen, lower alkyl, N,N-di-lower alkyl-amino-lower alkyl, N,N-alkylene-imino-lower alkyl, in which alkylene has from four to six carbon atoms, (4-lower alkyl-1-piperazino)-lower alkyl, (4-morpholino)-lower alkyl, cycloalkyl having from three to eight ring carbon atoms, cycloalkenyl having from five to eight ring carbon atoms, cycloalkyl-lower alkyl, in which cycloalkyl has from three to eight carbon atoms, cycloalkenyl-lower alkyl, in which cycloalkenyl has from five to eight ring carbon atoms, phenyl, lower alkyl-phenyl, lower alkoxy-phenyl, halogeno-phenyl, phenyl-lower alkyl (lower alkyl-phenyl)-lower alkyl, (lower alkoxy-phenyl)-lower alkyl and (halogeno-phenyl)-lower alkyl, $R_3'$ stands for a member selected from the group consisting of hydrogen, lower alkyl and phenyl-lower alkyl, and $R_a$ is a member selected from the group consisting of hydrogen, lower alkyl, lower alkoxy, lower alkylenedioxy halogeno and trifluoromethyl, and a pharmaceutically acceptable acid addition salt thereof.

3. 1-oxo-1,2,3,4,6,7,12,12b-octahydro-2 - aza-indolo[2, 3-a]quinolizine.

4. 1,2,3,4,6,7,12,12b-octahydro-2-aza-indolo[2,3-a]quinolizine.

References Cited in the file of this patent
UNITED STATES PATENTS

| | | |
|---|---|---|
| 2,400,022 | Pollard et al. | May 7, 1946 |
| 2,507,408 | Jacob | May 9, 1950 |
| 2,843,590 | Scigliano et al. | July 15, 1958 |